United States Patent [19]
McLain, Jr.

[11] Patent Number: 5,850,536
[45] Date of Patent: Dec. 15, 1998

[54] METHOD AND SYSTEM FOR SIMULATED MULTI-TASKING

[75] Inventor: John V. McLain, Jr., Colorado Springs, Colo.

[73] Assignee: MCI Communications Corporation, Washington, D.C.

[21] Appl. No.: 641,460

[22] Filed: May 1, 1996

[51] Int. Cl.$^6$ .................................................. G06F 13/26
[52] U.S. Cl. .......................... 395/500; 395/677; 395/737; 364/578
[58] Field of Search .................................. 395/500, 672, 395/673, 674, 677, 737; 364/578

[56] References Cited

U.S. PATENT DOCUMENTS

| | | | |
|---|---|---|---|
| 4,552,297 | 11/1985 | Belanger et al. | 227/120 |
| 4,555,602 | 11/1985 | Baxter, III et al. | 364/200 |
| 4,575,797 | 3/1986 | Gruner et al. | 364/200 |
| 4,636,948 | 1/1987 | Gdaniec et al. | 364/300 |
| 4,737,985 | 4/1988 | De Luca et al. | 379/327 |
| 4,799,251 | 1/1989 | Smith et al. | 379/1 |
| 4,924,493 | 5/1990 | Dang et al. | 379/94 |
| 5,005,197 | 4/1991 | Parsons et al. | 379/21 |
| 5,008,812 | 4/1991 | Bhandarkar et al. | 364/200 |
| 5,027,343 | 6/1991 | Chan et al. | 370/17 |
| 5,095,505 | 3/1992 | Finucane et al. | 379/201 |
| 5,157,665 | 10/1992 | Fakhraie-Fard et al. | 371/20.1 |
| 5,170,362 | 12/1992 | Greenberg et al. | 364/550 |
| 5,187,740 | 2/1993 | Swaim et al. | 379/209 |
| 5,197,127 | 3/1993 | Waclawsky et al. | 395/200 |
| 5,222,120 | 6/1993 | McLeod et al. | 379/88 |
| 5,224,108 | 6/1993 | McDysan et al. | 370/110.1 |
| 5,226,041 | 7/1993 | Waclawsky et al. | 370/60 |
| 5,241,584 | 8/1993 | Hardy et al. | 379/67 |
| 5,276,440 | 1/1994 | Jolissaint et al. | 340/825.02 |
| 5,280,481 | 1/1994 | Chang et al. | 370/85.13 |
| 5,285,494 | 2/1994 | Sprecher et al. | 379/59 |
| 5,323,388 | 6/1994 | Chang et al. | 370/60 |
| 5,335,268 | 8/1994 | Kelly, Jr. et al. | 379/112 |

(List continued on next page.)

OTHER PUBLICATIONS

Koji et al, The Multi-Project Support System Based on Multiplicity of Tash, pp. 358–636.

Palmer et al., "Restoration in a Partitioned Multi-Bandwidth Cross-Connect Nework," IEEE 1990 (pp. 81–85).

Martin, J. et al. TCP/IP Networking: Architecture, Administration and Programming, PTR Prentice Hall, Englewood Cliffs, NJ, pp. 6–8 (1994).

Minoli, D., "Telecommunications Technology Handbook," Artech House: Norwood, MA chapter 3, pp. 101–168 (1991).

Peterson, J. et al. "Introduction," Operating System Concepts, 2nd Edition, Addison–Wesley Publishing, USA, pp. 1–15 (1986).

Primary Examiner—Kevin J. Teska
Assistant Examiner—Russell W. Frejd

[57] ABSTRACT

A computer-implemented method and apparatus for servicing multiple external interfaces in a pseudo-parallel fashion which simulates multi-tasking. An application program is programmed to switch control during the servicing of multiple external units and/or time-consuming CPU steps to optimize overall application execution time. An application services each of these external interface units through calls to respective program modules. Relatively long program modules contain calls to transfer system control to shorter program modules which await servicing. These calls are strategically inserted in a long program module after one or more partial logic of units of work have been completed. At the time of each call, a check is first made to determine whether servicing of another external interface unit with a short program module is required. If servicing is required, then control is transferred to execute the short program module. Switches between servicing the multiple external interfaces, such as a user-interface and a communication link, are substantially transparent to external users. Subsecond responses are provided simulating multi-tasking of the communication interface and the user-interface during execution of an application by a personal computer.

18 Claims, 5 Drawing Sheets

U.S. PATENT DOCUMENTS

| | | | |
|---|---|---|---|
| 5,337,306 | 8/1994 | Hall | 370/13 |
| 5,343,461 | 8/1994 | Barton et al. | 370/13 |
| 5,355,405 | 10/1994 | Bernstein | 379/246 |
| 5,373,501 | 12/1994 | Roland | 370/13 |
| 5,375,126 | 12/1994 | Wallace | 371/20.1 |
| 5,375,159 | 12/1994 | Williams | 379/23 |
| 5,384,822 | 1/1995 | Brown et al. | 379/10 |
| 5,394,540 | 2/1995 | Barrington et al. | 395/500 |
| 5,396,616 | 3/1995 | Venable | 395/500 |
| 5,410,586 | 4/1995 | Davies | 379/14 |
| 5,414,858 | 5/1995 | Hoffman et al. | 345/725 |
| 5,435,003 | 7/1995 | Chng et al. | 395/575 |
| 5,438,528 | 8/1995 | Emerson et al. | 364/580 |
| 5,444,693 | 8/1995 | Arslan et al. | 370/16 |
| 5,488,648 | 1/1996 | Womble | 375/13 |
| 5,490,272 | 2/1996 | Mathis | 395/360 |
| 5,513,345 | 4/1996 | Sato et al. | 395/182.02 |
| 5,557,795 | 9/1996 | Venable | 395/650 |
| 5,563,930 | 10/1996 | Pester, III | 379/34 |
| 5,594,792 | 1/1997 | Chouraki et al. | 379/269 |
| 5,600,632 | 2/1997 | Schulman | 370/252 |
| 5,636,345 | 6/1997 | Valdevit | 395/200.11 |

METHOD AND SYSTEM FOR SIMULATED MULTI-TASKING

CROSS-REFERENCE TO RELATED APPLICATIONS

This patent application is potentially related to the following commonly owned, co-pending U.S. utility patent applications:

1. "Method and Apparatus for Emulating a Dynamically-Configured Digital Cross-Connect Switch Network," Ser. No. 08/641,458, by John V. McLain, Jr. and James D. Dellinger, filed concurrently herewith and incorporated herein by reference;

2. "Method and Apparatus for Emulating a Digital Cross-Connect Switch Network," Ser. No. 08/641,459, by John V. McLain, Jr. filed concurrently herewith and incorporated herein by reference; and 3. "Method and Apparatus for Emulating a Flexible Digital Cross-Connect Switch Network to Test MCS Network Management," Ser. No. 08/641,461, by John V. McLain, Jr., filed concurrently herewith and incorporated herein by reference.

BACKGROUND OF THE INVENTION

Related Art

Computer operating systems (OS) are software that provide the means for computer users and applications to utilize and communicate with computer hardware. Common operating systems for microcomputers, such as MS-DOS from Microsoft Corporation or PC-DOS from IBM Corporation, are known as single-tasking operating systems. This is because they allow the Central Processor Unit (CPU) to process sequential tasks for a single application in a given interval of time.

More sophisticated operating systems, such as OS/2 from IBM and System 7.0+ for Macintosh applications, are known as multi-tasking operating systems. This is because they allow the central processor to process tasks from multiple applications in a given interval of time. They do this by managing control of the processor. Although the processor itself is single-threaded and can only perform one task at a time, control of the processor is transferred from one application to another automatically by the operating system.

There are generally two methods of multi-tasking in the industry: cooperative multi-tasking and pre-emptive multi-tasking. Cooperative multi-tasking places control of which task the CPU processes within each application. An application must first relinquish control of the CPU before processing can be transferred to another application. If an application doesn't relinquish control, it effectively steals CPU time from another application.

Pre-emptive multi-tasking places complete control of which task the CPU processes within the operating system. In this way, CPU load balancing among various applications is more closely controlled. However, it requires storing context data pertaining to the task that processing is being transferred from, and retrieving that data when processing returns to that task. This data may be stored in random access memory, if enough is available; otherwise main memory or any type of remote media storage (i.e. virtual memory, hard disk, CD-ROM, optical disk, and/or tape drives). Storing and retrieving task data (known as swapping) with a computer's hard disk can be very time-consuming.

Time-consuming CPU operations, such as servicing multiple external interface units and/or executing lengthy program steps, need to be completed more efficiently. Multiple external interface units and/or CPU-intensive routines need to be serviced in manner simulating multi-tasking without the overhead and delays encountered in existing co-operative and pre-emptive multi-tasking systems. When multiple external user inputs are present, each external user must perceive that a processor is continuously servicing its corresponding external interface unit. Idle CPU time needs to be minimized.

SUMMARY OF THE INVENTION

The present invention provides a computer-implemented method and apparatus for performing multiple computer program tasks in a pseudo-parallel fashion which simulates multi-tasking. Program modules for carrying out the multiple tasks are programmed to switch control between tasks. Relatively long, time-consuming program modules contain calls to transfer processor control to shorter program modules which await servicing. Preferably, these calls are strategically inserted after one or more partial logic units of work in a long program module. The results of the shorter program module are then made available sooner. Control returns to the relatively long program module before a delay is perceived. In this way, multiple computer tasks are performed efficiently in a pseudo-parallel order which reduces idle CPU time and while maintaining the perception of continuous multi-tasking to external users.

In one embodiment, a method and apparatus for servicing multiple external interface units in a pseudo-parallel order simulating multi-tasking is provided. An application program services each of these external interface unit through calls strategically inserted in respective program modules. Relatively long program modules contain calls to transfer system control to shorter program modules which need servicing. These calls are strategically inserted in a long program module after one or more partial logic units of work have been completed. At the time of each call, a check is first made to determine whether servicing of another external interface unit with a short program module is required. If servicing is required, then control is transferred to execute the short program module.

The short program module further contains strategically programmed calls to return system control to the long program module before an external user can notice the interruption in the servicing of the external interface unit driven by the long program module. The calls can be inserted in the short program module after a complete logic unit of work (for relatively quick tasks) or after one or more partial logical units of work (for longer tasks).

In a preferred example of this embodiment, a simulated multi-tasking routine is used to switch control between a user-interface module and a communication module. The user-interface module services user-inputs through a keyboard and/or mouse device and application outputs through a printer and/or display. The communication module services communications received and sent over a communication link. Significant CPU efficiencies are realized, as hundreds of external devices can be serviced by one CPU. Larger applications can be run on smaller, less expensive CPUs, thereby, extending the useful life of existing platforms. Idle CPU time, such as the delays which arise from waiting for user keyboard inputs or printer outputs, is significantly reduced while still conveying the perception of multi-tasking to external users.

In another embodiment, a method and apparatus for executing lengthy computer program steps and relatively short computer program steps in a pseudo-parallel order simulating multi-tasking is provided. Relatively long program modules (i.e. lengthy computations or logic paths, such as complex spreadsheet operations or nested conditional branching operations) contain calls to transfer system control to shorter program modules which need servicing. These calls are strategically inserted in a long program module after one or more partial logic units of work have been completed. The short program module further contains strategically programmed calls to return system control to the long program module before any suspension of the first long program module is adversely noticed. The calls can be inserted in the short program module after a complete logic unit of work (for relatively quick tasks) or after one or more partial logical units of work (for longer tasks).

In general, with respect to either of the embodiments, the transfer of system control is determined by the application programmers, and therefore allows processing time per task to be managed more closely than with cooperative multi-tasking. In addition, the state of each task is recorded within local and global parameters. This eliminates the need for disk-swapping that is required for pre-emptive multi-tasking, and therefore enables task processing to proceed quicker than with pre-emptive multi-tasking.

Further, system control transfer is optimized, automatic and based on programmed source code. This eliminates unnecessary delays introduced into the program that are caused by a process checking for input from an external source and/or waiting until the input is received before proceeding to the next task.

Since the present invention provides simulated multi-tasking via application programming, it can be operated on either a single-tasking or multi-tasking operating system. Since the simulated multi-tasking routine is programmed into the application rather than the operating system, it is also portable among different types of operating systems.

Further features and advantages of the present invention, as well as the structure and operation of various embodiments of the present invention, are described in detail below with reference to the following drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art make and use the invention.

The present invention will now be described with reference to the accompanying drawings. In the drawings, like reference numbers typically indicate identical or functionally similar elements. Additionally, the left-most digit(s) of a reference number typically identifies the drawing in which the reference number first appears.

DETAILED DESCRIPTION OF THE PREFERRED EMBODIMENTS

Table of Contents

Page

Terminology ............................................. 8

Example Environment ......................................8

Simulated Multi-Tasking ....................................9

Architecture .........................................9

Operation .........................................11

Example .........................................16

Summary of Advantages ......................................... 19

Tutorial Appendix ....................................... 21

Conclusion .......................................... 23

Terminology

To more clearly delineate the description of the present invention, an effort is made throughout the specification to adhere to the following term definitions as consistently as possible:

A Partial Logical Unit of Work (PLUW) is an elementary logical process within a program, such as a program module for servicing an external interface or any other computer task. A Complete Logical Unit of Work (CLUW) consists of an entire logical process in a program, such as a program module servicing on an external interface or any other complete task. One or more PLUWs can constitute a single CLUW.

External interfaces provide data communication between external interface units (including multiple instances thereof, i.e. multiple printers) and a CPU. The external interface units can include, but are not limited to, any I/O type of peripheral device (i.e. a keyboard, mouse, trackball, joystick, and display unit), a data communication link, network link, or an external application program.

Example Environment

The present invention for simulating multi-tasking is described in the example environment of personal computer application program modules for servicing multiple external interfaces or other CPU-intensive computer tasks. Description in these terms is provided for convenience only. It is not intended that the invention be limited to application in this example environment. In fact, after reading the following description, it will become apparent to a person skilled in the relevant art how to implement the invention in alternative computer programming applications, systems, and environments. Since the invention provides a fundamental method of developing software applications, an infinite number of examples exist that make use of the present invention.

Simulated Multi-Tasking

Architecture

Figure 1:
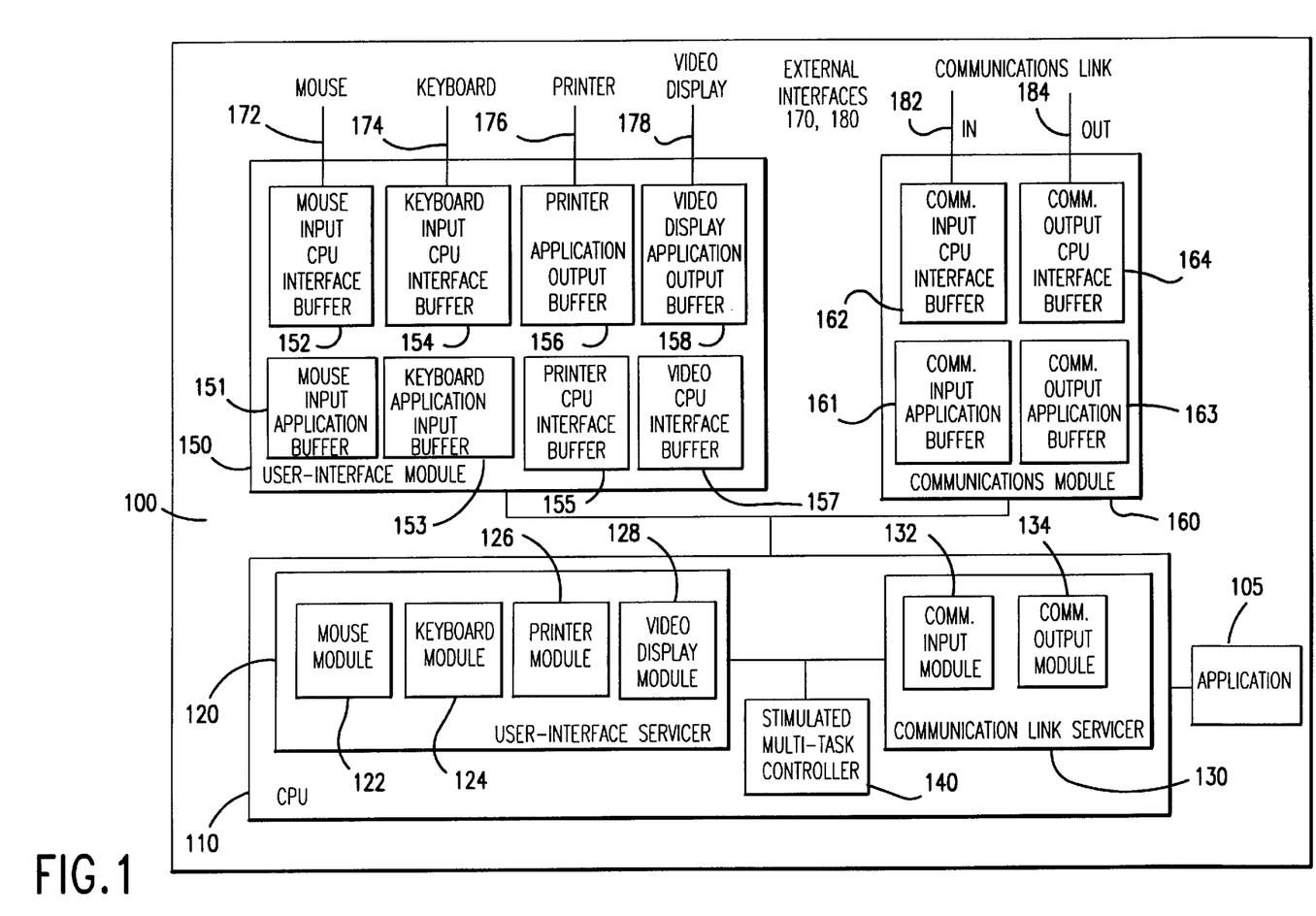
FIG. 1 is a block diagram of a computer architecture for simulating multi-tasking according to the present invention.
Figure 2:
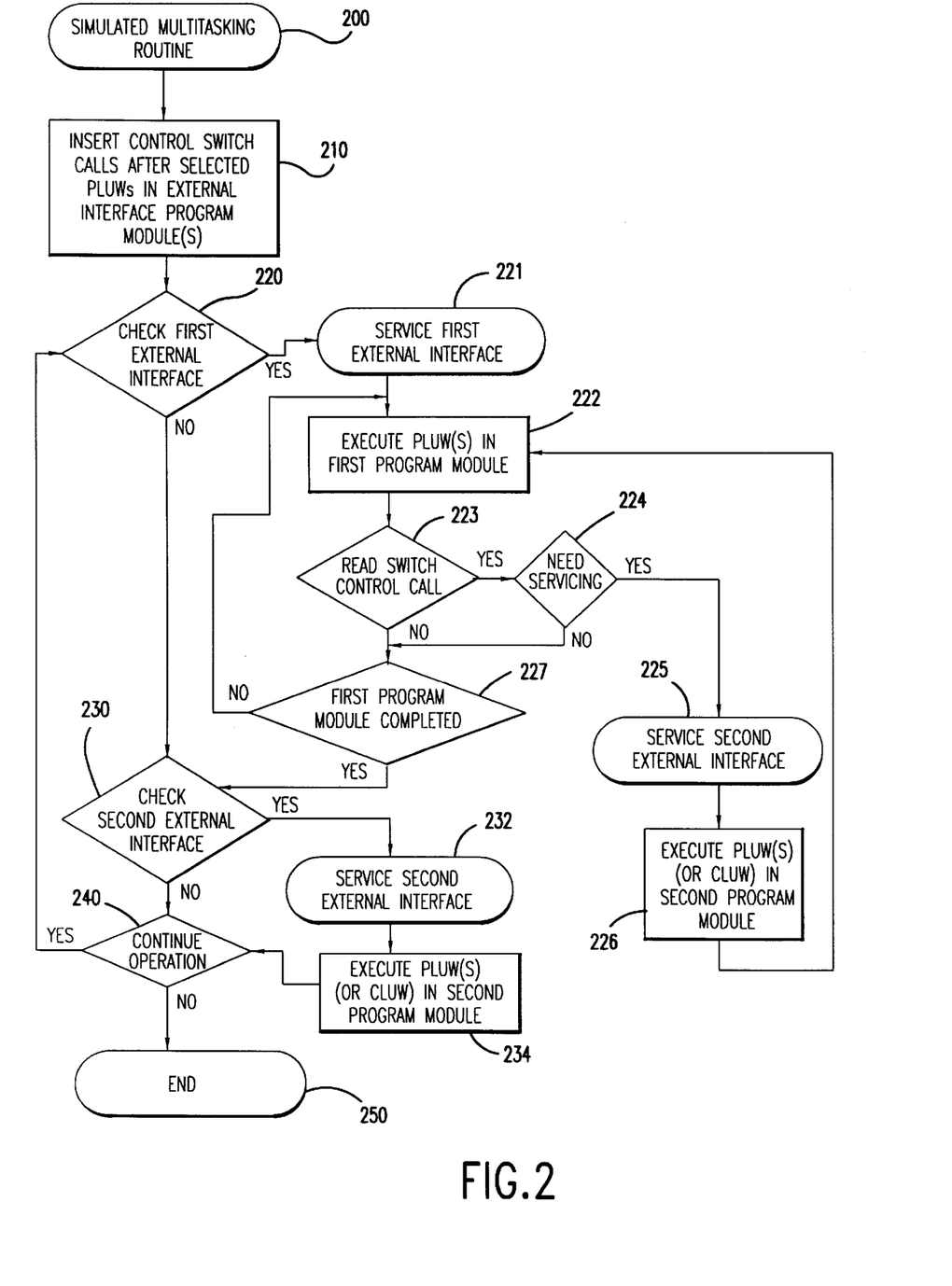
FIG. 2 is a flowchart illustrating a simulated multi-tasking process.
Figure 3A:
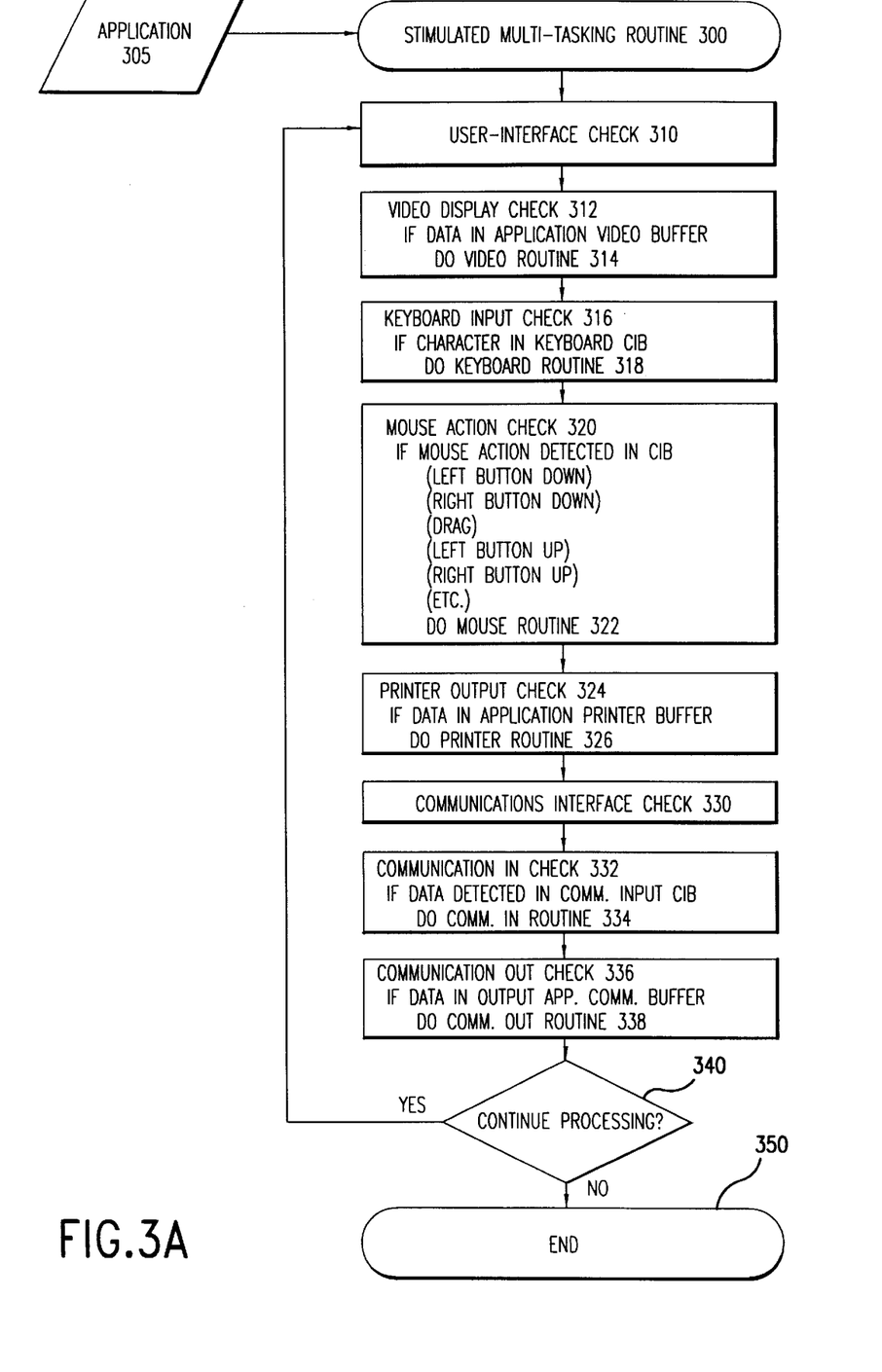
FIGS. 3A and 3B show a program implementation of the simulated multi-tasking process.
Figure 3B:
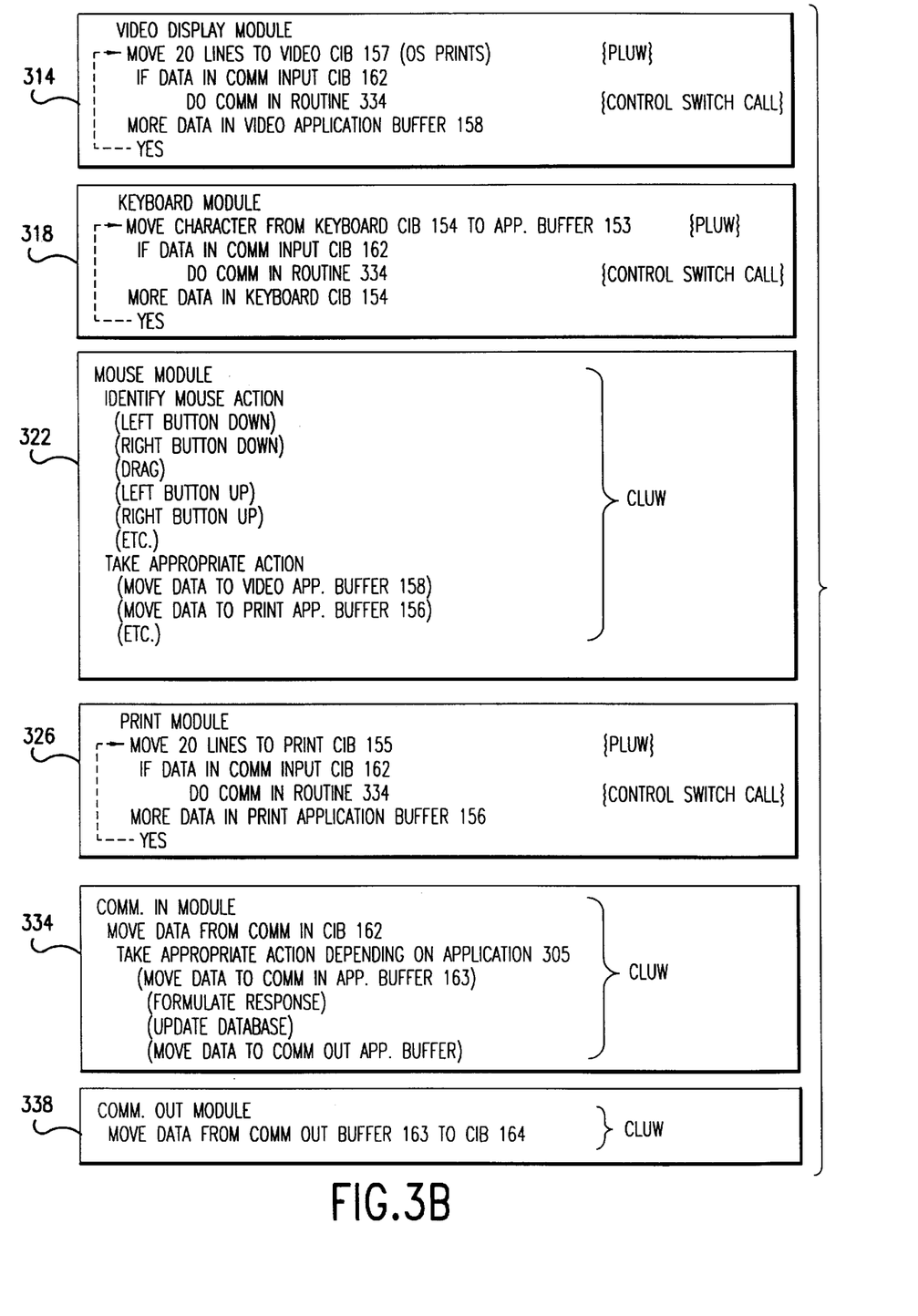
Figure 4:
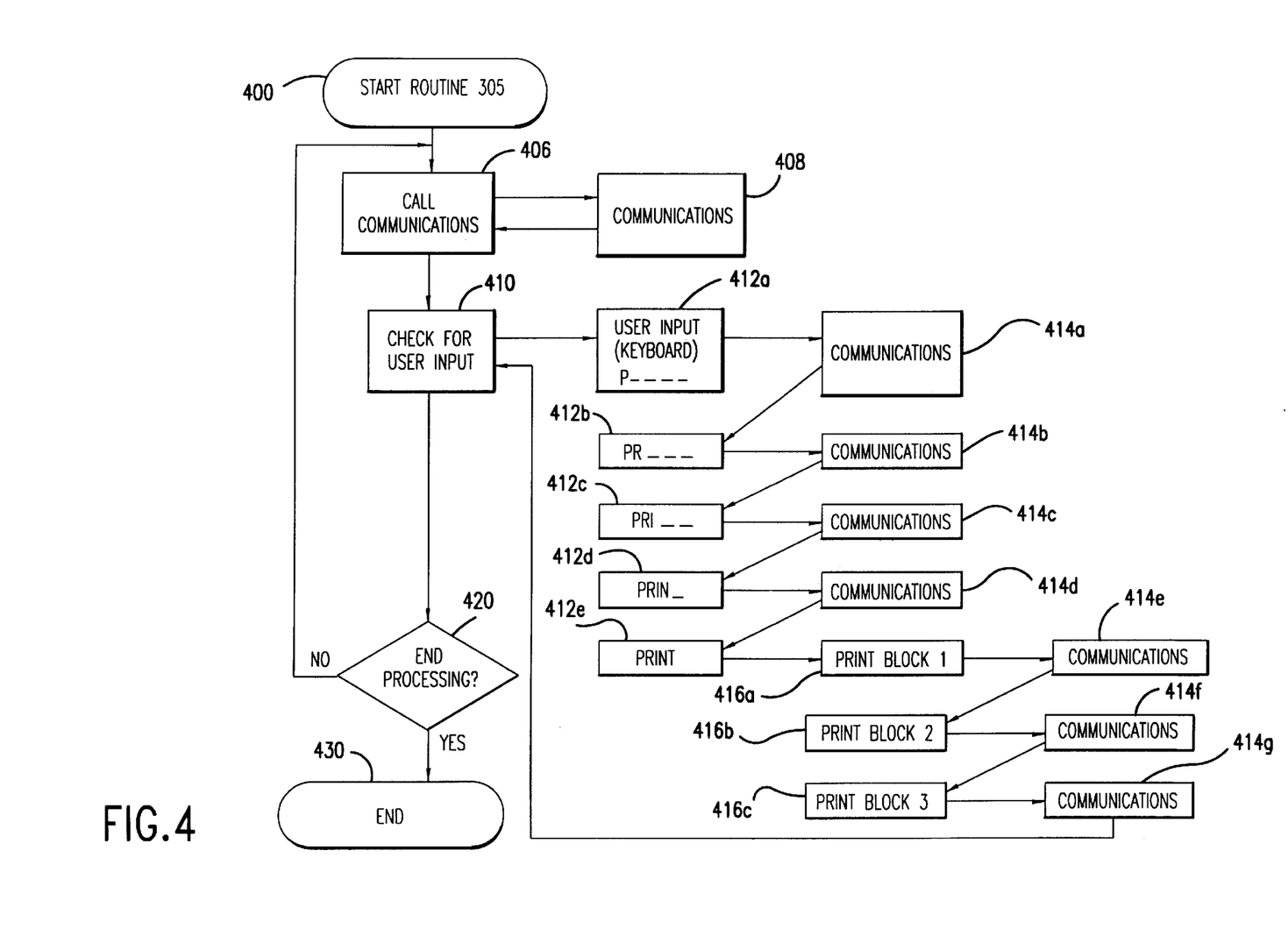
FIG. 4 is a flow chart illustrating an example of simulated multi-tasking carried out in response to particular external user inputs.

A first embodiment of the present invention is described with respect to FIGS. 1 to 4. FIG. 1 shows a functional block diagram of an example personal computer system architecture 100 for servicing multiple external interfaces 170, 180 according to the present invention. FIG. 2 shows a simulated multi-tasking routine 200 as used in the present invention. FIG. 3 shows examples of program modules for servicing respective external interface units. FIG. 4 shows a specific example illustrating the operation of the present invention.

Referring to FIG. 1, a CPU 110 is responsible for executing application 105 and servicing multiple external interfaces including a user-interface 170 and a data communication interface 180. A users-interface servicer 120 services the user-interface 170. The communication link servicer 130 services the communication interface 180. A simulated multi-task controller 140, switches control between the user-interface servicer 120 and communication link servicer 130 in a pseudo-parallel fashion to simulate multi-tasking.

The user-interface 170 example includes a mouse 172, keyboard 174, printer 176, and a video display 178. The communication interface 180 includes an in-bound communication link 182 and an out-bound communication link 184.

These external interfaces for a computer are illustrative. As would be apparent to one skilled in the art, any external interface unit and multiple instances thereof can be used, including any peripheral input device (such as a joystick, tablet, stylus, light pen, and touch screen), I/O device, and/or network link can be used to provide communication between the CPU 110 and any external user. The in-bound and out-bound communication links 182, 184 can be configured as one or more physical and/or logical links for uni-directional and/or bi-directional data flow.

A user-interface module 150 is coupled between the CPU 110 and the user-interface 170. A communication module 160 is coupled between the CPU 110 and the communication interface 180. In general, the user-interface module 150 manages data communication between the peripheral external interface units 172–178 and the CPU 110. The communication module 130 manages data communication between the communication link(s) 182, 184 and the CPU 110 including providing a standard data communication protocol (i.e. X.25, ATM, TCP, IP, Frame Relay, Token Ring, Ethernet, FDDI and any other protocol), multiplexing/de-multiplexing, routing, packeting, framing and any other data communication action.

CPU Interface buffers are provided for storing and queuing user-inputs sent to the CPU 110. A mouse input buffer 152 holds peripheral inputs from the mouse 172. These mouse inputs can include mouse button information (click/double-click of a left, center, and right mouse button), movement information (drag, drag distance and/or speed), or any other type of mouse action. A keyboard input buffer 154 holds peripheral inputs received from the keyboard 174. These keyboard inputs can include characters, keystrokes, combinations of keystrokes, or any other type of keyboard action. A communication input buffer 162 holds in-bound communication message(s) received over the communication link 182. CPU Interface Buffers 155, 157 can also be provided for the printer 176 and Video Display 178.

Application Interface buffers are provided for storing and queuing messages generated by the CPU 110 during execution of the application 105 to be sent to the external interfaces 170, 180. A printer output buffer 156 queues print data to be sent to printer 176. A video display output buffer 158 queues display data to be sent to the video display 178. Application buffers 151, 153 for the mouse and keyboard can also be included. Any of the above CPU interface buffers and the Application interface buffers can be arranged in a CPU cache memory, main memory, hard disk or any other type of media storage device.

User-interface servicer 120 and communication link servicer 130 access respective program modules (122–128 and 132–134) for servicing each of the external interface units (172–178 and 182–184) under the control of the simulated multi-task controller 140. A mouse module 122 services the mouse 172. A keyboard module 124 services the keyboard 174. A printer module 126 services printer 176. A video display module 128 services the video display 178. Communication input module 132 and communication output module 134 service the in-bound and out-bound communication links 182 and 184 respectively. User-interface servicer 120, communication link servicer 130, simulated multi-task controller 140, and their constituent program modules (122–128 and 132–134) can be implemented through software, firmware, hardware, or any combination thereof.

Further, according to the present invention, the simulated multi-task controller 140 switches control between the user-interface servicer 120 and communication link servicer 130 according to a simulated multi-tasking routine.

Operation

FIG. 2 shows a general simulated multi-tasking routine 200 according to the present invention. Though described with respect to program modules for servicing external interfaces, this simulated multi-tasking routine 200 applies broadly to simulating multi-tasking between any two computer-implemented tasks. A specific program implementation of the simulated multi-tasking routine is further shown in FIGS. 3A and 3B for use in computer system 100 of FIG. 1. FIG. 4 shows an example of the operation of simulated multi-tasking in response to specific user-inputs, namely, the entering of a keyboard PRINT command.

In step 210, control switch calls are inserted after selected partial logical units of work (PLUWS) in one or more external interface program modules which serve respective first and second external interface units. To optimize the overall execution time for carrying out an application, the control switch calls are inserted in program modules which take a relatively long-time to process. For example, program modules which wait for a user-input or process a large amount of data can take longer than other program modules involving relatively quick data manipulation and/or instruction processing by a CPU. These control switch calls further tell the simulated multi-task controller 140 to switch control to service any other external interface unit having a relatively short CLUW time. Overall application processing time is optimized as the second external interface, such as user-interface 170, communication interface 180 or any other type of computer interface, is serviced quicker and available sooner for further processing.

Step 210 is usually performed as part of a pre-processing routine. Steps 220–250 are then carried out during execution of the application 105 to simulate multi-tasking. In this way, multiple external interfaces are serviced in a pseudo-parallel fashion nearly simultaneously with sub-second response. As used herein, sub-second response includes millisecond and even nanosecond CPU response times to the external interface units.

In step 220, the simulated multi-task controller 140 checks a first external interface to determine whether servicing of any first external interface unit is needed. Servicing is needed if data is present in any corresponding buffer for the first interface units, i.e. a CPU Interface input buffer or an application output buffer. A buffer can be checked directly for data. Alternatively, any other indicator such as a flag or semaphore can be checked to determine whether servicing is needed.

To service the first external interface (step 221), the simulated multi-task controller 140 executes a first program module corresponding to the particular external interface unit having data in its application or CPU interface buffer. One or more PLUWs of the first program module are executed (step 222) until a switch control call is read (step 223) or until the first program module is completed (step 227). When a switch control call to the second interface is read, the simulated multi-task controller checks to see if the second interface needs servicing (step 224). For example, servicing is needed if data is found in a corresponding buffer for the second external interface units.

If the second interface does need servicing, the simulated multi-task controller temporarily halts the execution of the first program module, and switches control to service the second external interface (step 225). One or more PLUWs of the second program module are then executed (step 226). Preferably, a CLUW is completed when the second interface unit can be serviced in a much quicker duration than a CLUW for the first external interface unit serviced at step 222.

The simulated multi-task controller then returns control back to servicing the first external interface (step 222). One or more further PLUWs are executed in the first program module until another switch control call is read (step 223) or the first program module to completed (step 227). In this way, control switches back and forth to service both of the first and second external interfaces in a pseudo-parallel fashion. The placement of the switch control calls after one or more PLUWs in each of the first and second program modules is predetermined to optimize the overall execution time of the first and second program modules in servicing first and second external interfaces. Both of the first and second external interfaces are serviced quickly and efficiently in a manner simulating multi-tasking but without the overhead incumbent in multi-tasking operating systems.

When servicing is not needed at the first external interface (step 220) or the first program module has been executed in full (step 227), the simulated multi-tasking controller 140 proceeds to similarly check a second interface to determine whether any second interface unit needs servicing (step 230). As in step 225, servicing is needed when data is found in a corresponding buffer for the second external interface units. If the second external interface does need servicing, it is serviced quickly by executing one or more PLUW(s) (for longer tasks) or a CLUW (for shorter tasks) (steps 232 and 234). Idle CPU time is reduced as the task required to service the second interface can be completed rapidly without waiting for the first external interface to be fully serviced.

After the second external interface has been checked (step 230) and serviced if necessary (step 234), a decision is made at step 240 on whether to continue operation by returning to step 220 or ending the operation (step 250).

In FIGS. 3A and 3B, the functionality of a simulated multi-tasking routine 300 is pre-programmed into an application program 305, program modules for checking the external interfaces (310, 312, 316, 320, 324, 330, 332, and 336), and program modules for servicing the external interfaces when necessary (314, 318, 322, 326, 334, and 338). FIG. 3A shows two program modules 310 and 320 for servicing a first external interface (user-interface 170) and a second external interface (communications interface 180). To service the user-interface 170, the program module 310 is programmed to check and service each user-interface peripheral unit, if necessary (steps 312 to 326). To service the communication interface 180, the program module 320 is programmed to check and service each communication interface peripheral unit (steps 332–338). At step 340, the simulated, multi-tasking routine 300 either returns to step 310 or ends simulated multi-tasking processing at step 350.

As shown in FIG. 3B, one or more partial logical units of work (PLUWs) are identified for each complete logical unit of work CLUW in the program modules (314, 318, 322, 326, 334, and 338). For example, moving 20 lines of display data or less to the video CPU Interface buffer 157 constitutes a selected PLUW in the video display module 314. Moving one character from the keyboard CPU Interface buffer 154 to the Application Output Buffer 153 or directly to the video display buffer 158 or the printer buffer 156, is chosen as a PLUW in the keyboard module 318. Moving a block of 20 lines to the printer CPU Interface buffer 155 is a selected PLUW for the print module 326. Each of these PLUWs can be made longer or shorter as needed depending on the specific external interface unit operation and the perceptions of corresponding external users.

The tasks of the mouse module 322, communication in module 334, and communication out module 338 can be completed relatively quickly by a CPU 110. Therefore, the entire CLUW is performed by the respective user-interface service 120 and communication link servicer 130 without interruption.

Control switch calls are inserted after a selected partial logical unit(s) of work (PLUW) in the video display program module 314, keyboard program module 318, and print module 326. These control switch calls switch control to service communication module 334, if necessary. This reduces overall application processing time as selected PLUW(s) or CLUW in the communication module 334 can be serviced in a total duration which is transparent to a user awaiting further display or printer output or a response to a keyboard entry. In addition, the time spent executing PLUWs in any of one of the video display module 314, keyboard module 318, mouse module 322, and the print module 326 is transparent to any communication device and application communicating with the computer 100 through communication interface 180.

The above description describes a manual pre-processing determination of PLUW and CLUW information and the insertion of control switch calls in program modules; however, automation of such operations is also contemplated. The principle and strategy for identifying PLUWs and control switch calls is described further in a brief tutorial in the accompanying Appendix.

Example

FIG. 4 shows an example of a simulated multi-tasking process 400 carried out in response to specific external user-inputs, namely a PRINT command entered through a keyboard. In other examples, the user input can be the click of a mouse, a word spoken into a voice recognition device, or any other type of user-input.

The pre-programmed application program 305 is being executed in CPU 110 as the user types on the keyboard 174. As shown in steps 406 and 408, the communication interface 180 may have already been checked and serviced many times by executing communication program modules (330–338).

In step 410, the simulated multi-task controller 140 switches control to user-interface servicer 120 which begins to execute the user-interface check modules (310–326). First, the video application output buffer 158 is checked for data (video display program check 312). No data is found, so the video display program module 314 for displaying video data is not executed.

In step 412, the keyboard 174 is checked (keyboard program check 316) and a character "P" is found in the keyboard buffer 154. The user-interface servicer 120 then executes keyboard routine 326 and performs the first PLUW to move the character "P" from the keyboard CPU interface buffer 154 to the keyboard application buffer 153.

When a control switch call is read, the simulated multi-task controller 140 switches control to the communication link servicer 130 which checks the input CPU buffer 162 to determine whether in-bound communication needs to be serviced. In step 414a, the communication link servicer 140 executes the communication-in program module 334.

In this example, the communications module in step 414a executes very quickly, perhaps in a matter of a few milliseconds. Keyboard entry from a human is much slower, and it may take several seconds to complete an entire command, such as a "PRINT" command. To ensure that messages continue to be received over communication link 182 and are not delayed or lost in buffer overflow while the CPU 110 accepts slow user inputs, the call to the communications module 414a . . . 414g is programmed into the source code to execute after each single character of user input from the keyboard (PLUW). Thus, after the user inputs the first character of the command, "P", a call to the Communications module 334 is executed.

According to a further optional feature of the invention, the communication link servicer 130 does not wait for a response before proceeding to the next task. Therefore, in step 414a, when the Communications program module 334 has cycled once, a user-interface check (not shown) can be made to determine whether the next user input, i.e. the next keyboard character has been entered. When another user-input is not yet present in a appropriate buffer, the communication module 334 is repeated. In this way, the external communication interface units continue to be serviced by the Communications module 334 without waiting for the next user input. Indeed, the simulated multi-tasking controller 140 in executing program 305 spends only a minimum amount of time checking buffers for user inputs; this time is short enough to not be perceived by the external communication interface 180 as an interruption in processing.

After step 414a, when the communications module 334 is completed and a second keyboard character "R" is detected, the simulated multi-tasking controller 140 returns control to the user-interface 120 to accept user input(s) (step 412b). In step 412b, the user-interface servicer 120 then executes keyboard routine 326 and performs the first PLUW to move the character "R" from the keyboard CPU interface buffer 154 to the keyboard application buffer 153.

When the control switch call is read, the simulated multi-task controller 140 again switches control to the communication link servicer 130 which checks the input CPU buffer 162 to determine whether in-bound communication needs to be serviced. In step 414b, the communication link servicer 140 executes the communication program module 334. The simulated multi-task controller 140 then switches control between the user-interface servicer 120 and the communication interface servicer 130 to carry out steps 412c–412e and steps 414b–414d as described above with respect to steps 412a and 414a. As a result, both the user-interface 170 and the communication interface 180 (which can include hundreds of devices and communication sessions) are serviced under the control of the simulated multi-task controller 140 in a pseudo-parallel manner that optimizes the overall application execution time and gives the perception to all external users that each external interface 170, 180 is being serviced in parallel without interruption.

After the complete user input of the "PRINT" command is accepted, in step 412e, the program 305 then calls printer module 126, which begins printing a selected PLUW, i.e. a first print block of 20 lines (step 416a). Now assume that in this example, a 60-line report is to be printed. The time it would take to print the entire 60-line report at once would introduce an unacceptable delay in the servicing of communications links 182, 184. Therefore, the printing of the report is broken down into three PLUWs.

After the first print block is executed (i.e. moved from a Printer application output buffer 156 to a CPU Interface Printer Output buffer 155) in step 416a, the simulated multi-task controller 140 switches control to service the communications interface 180 by executing the communication-in program module 334 if necessary (step 414e). After the communication module 334 has executed, the simulated multi-tasking controller 140 switches control back to the user-interface servicer 120 to continue printing second print block 2 (step 416b). Control continues to be swapped between the external interface units in steps 414f, 416c, and 414g.

After step 414g, the program 305 returns to where it was when it first checked for user input (step 410). Alternatively, the program 305 can return to service external user inputs and/or application outputs at the communication interface 180. The program 305 proceeds to step 420, where any of a variety of tests may be executed to determine whether to continue or end processing (step 430).

When a call from one program module to another program module is made, the first program module must leave itself in a known state. At a minimum, this state must be at the completion of a PLUW, as a PLUW is the most elementary process that is performed by the CPU. Data indicating this state may be kept in a set of local or global parameters. If no other module needs to know what state that module is in, then that module records its state in a set of local parameters (readable only by that module). If one or more other modules require knowledge of that module's state, then that module records its state in a set of global parameters (readable by entire program). Recording the state in either global or local parameters is a much simpler task than storing context data in conventional pre-emptive multi-tasking and does not involve disk-swapping.

For example, in step 416a, the user-interface servicer 120 executes the print module 126 which prints the first block of the report by executing one or more PLUWs. Before control switches to service the communications interface in step of 414e, the user-interface servicer 120 executes the print module 126 records its present state in a set of local parameters, i.e. an instruction pointer. When control returns in step 416b to the user-interface servicer 120 to continue executing the print module 126, the present state of the print module 126 is known and can resume printing at print block 2.

Summary of Advantages

By transferring control of the system among various tasks of multiple functions at the discretion of the application programmers and without the use of disk swapping, the present invention provides simulated multi-tasking that surpasses the performance of true multi-tasking for many applications. It is well-suited for applications that must emulate the continual operation of physical devices, in that it allows multiple CPU-intensive functions to be executed transparently without being noticed by users and peripheral systems.

Significant CPU efficiencies are realized, as hundreds of external devices or program steps can be serviced in a manner simulating multi-tasking by one CPU. Larger applications can be run on smaller, less expensive CPUs, thereby, extending the useful life of existing platforms. Idle CPU time, such as the delays which arise from waiting for user keyboard inputs or printer outputs, is significantly reduced while still conveying the perception of multi-tasking to external users.

Control of the CPU (that is determining which task the CPU addresses) is entirely at the discretion of the programmer. The tasks required to service each external interface unit (172–178, 182, 184) or in general any program step are divided into elementary PLUWs. The content and number of PLUWs that are to be executed in one program module before performing a transfer to another module is determined by the programmer based on the amount of time required to execute each PLUW and the amount of time that the program can afford to give to one task and still maintain the perception of multi-tasking to the external users. By breaking the program into PLUWs, the programmer can tune application processing to address certain tasks at certain times, and thereby control the multi-tasking features of the program.

In addition, the programmer can ensure that no unnecessary delays are introduced into processing in the form of waiting for a particular response. The program can check for an input or response, and if none are found, proceed without waiting to the next PLUW of another task. This eliminates unnecessary delays and enhances the perception of transparent multi-tasking.

A further advantage over a true multi-tasking environment, and in particular over a pre-emptive multi-tasking operating system, is that time-consuming disk swapping is not required. Recording the state of a program module after a PLUW has been executed in simpler than storing context data (i.e. an instruction pointer and intermediate operational data) as done in conventional pre-emptive interrupt-based multi-tasking schemes.

Tutorial Appendix

An example of how simulated multi-tasking of computer-implemented tasks, as in the present invention, works to optimize overall application processing time is further explained in this brief tutorial by analogy to basic arithmetic equations. Assume a complex equation, Equation "A": $(1+1)*(2+2)*(3+3)=48$, is submitted to the invention to be computed. Before this computation commences, a simple equation, Equation "B": $(1+2)+5=8$, is submitted to be computed. Both equations are now queued in buffers waiting to be computed.

For illustrative purposes, assume each equation is solved in a novice manner at human speed and in a linear fashion. Assume further that multiplication takes 5 seconds and addition takes 2 seconds. The results of the equations need to be presented as rapidly as possible without consideration to the order they were acquired; priority is not a consideration in this simple example. This is to provide the external interface that is submitting each equation with the perception that it is the only interface being served. This would be the simulation of multi-tasking, only without the added delays of data swapping.

Process "A", i.e. a computer program segment, is to perform the computation on the complex Equation "A", and Process "B" is to perform the computation on the simple Equation "B". By dividing each equation, which represents a CLUW, into elementary PLUWs, computation can be performed on both equations in a pseudo-parallel manner that is perceived to be simultaneous. The following table illustrates this operation as a series of sequential steps, in which:

Process A computes Equation A: $(1 + 1)*(2 + 2)*(3 + 3) = 48$; and
Process B computes Equation B: $(1 + 2) + 5 = 8$.

| step | performing process | Equation A PLUW | Equation B PLUW | PLUW Time | total elapsed time |
|---|---|---|---|---|---|
| 1 | Process A | 1 + 1 = 2 | | 2 seconds | 2 seconds |
| 2 | Process B | | 1 + 2 = 3 | 2 seconds | 4 seconds |
| 3 | Process A | 2 + 2 = 4 | | 2 seconds | 6 seconds |
| 4 | Process B | | 3 + 5 = 8 | 2 seconds | 8 seconds |
| 5 | Process A | 3 + 3 = 6 | | 2 seconds | 10 seconds |
| 6 | Process A | 2*4 = 8 | | 5 seconds | 15 seconds |
| 7 | Process A | 8*6 = 48 | | 5 seconds | 20 seconds |

Control switches between servicing process A and process B until process B is complete (steps 1 to 4). The results of Process B are then presented at the end of 8 seconds (step 4). Process A continues to be serviced in steps 5 to 7. The results of Process A are presented at the end of 20 seconds (step 7).

If the equations were computed as individual CLUWS, then Equation A, which was submitted first and took a total of 16 seconds to compute (steps 1, 3, 5, 6, 7), would be presented at the end of 16 seconds. Equation B, which was submitted second and took a total of 4 seconds to compute (steps 2 and 4), would be presented at the end of 20 seconds, since it would have to wait for the completion of Equation A.

While the overall time to present the results of the two equations is the same (20 seconds), results of Equation B are presented to its requesting external interface at the end of 8 seconds, which is 12 seconds faster than computing each equation as individual CLUWs (20−8=12 seconds). The requester of Equation B can process the results and prepare for subsequent action while the results of Equation A are being computed. In this way, the overall application execution time for performing and presenting the results from both processes A and B is optimized.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for servicing communication between a processor and multiple external interfaces, the multiple external interfaces including a first external interface having at least one first external interface unit and a second external interface having at least one second external interface unit, the method comprising the steps of:

checking the first external interface to determine whether said at least one first external interface unit needs servicing;

servicing said at least one first external interface unit when said first external interface checking step determines that servicing is needed;

suspending said servicing of said at least one first external interface unit when at least one partial logical unit of work has been performed in servicing said at least one first external interface unit;

checking the second external interface to determine whether said at least one second external interface unit needs servicing;

servicing said at least one second external interface unit to perform at least one partial logic unit of work when said second external interface checking step determines that servicing is needed; and resuming said servicing of said at least one first external interface unit when at least one partial logical unit of work has been performed in servicing said second external interface unit, whereby the first and second external interfaces are serviced in a pseudo-parallel manner simulating multi-tasking.

2. The method of claim 1, further comprising the steps of:

after said first external interface checking step determines said at least one first external interface unit does not need servicing, further checking the second external interface to determine whether said at least one second external interface unit needs servicing and servicing said at least one second external interface unit to perform at least one partial logic unit of work when said further second external interface checking step determines that servicing is needed.

3. The method of claim 1, wherein said first external interface checking step comprises checking whether data has been placed in at least one buffer corresponding to each at least one first external interface unit.

4. The method of claim 1, wherein said second external interface checking step comprises checking whether data has been placed in at least one buffer corresponding to each at least one second external interface unit.

5. The method of claim 1, wherein the first external interface comprises a user-interface and said at least one first external interface unit comprises at least one mouse, keyboard, printer, and video display, and wherein the second external interface comprises a communication interface and said at least one second external interface unit comprises at least one of an in-bound and out-bound communication link.

6. The method of claim 1, wherein said at least one first external interface unit servicing step comprises executing a program module corresponding to the respective first external interface unit needing servicing in the processor.

7. The method of claim 6, further comprising the step of pre-programming said program module by inserting control switch calls after at least one partial logic units of work, said first external interface unit servicing step comprises executing said pre-programmed program module until a control switch call is read and said suspending step begins.

8. The method of claim 1, wherein the processor provides sub-second responses to first and second external interface units during said respective first and second external interface unit servicing steps.

9. A computer-implemented method for transparently switching between servicing first and second external interface units to simulate multi-tasking, the method comprising the steps of:

servicing the first external interface unit to perform a first partial logic unit of work in a first task;

suspending said servicing of the first external interface unit after said first partial logic unit of work in said first task has been performed;

servicing the second interface unit to perform at least one partial logic unit of work in a second task; and resuming servicing of the first external interface unit to perform a second partial logic unit of work in said second task, whereby said second task are performed in a pseudo-parallel sequence simulating multi-tasking.

10. The method of claim 9, wherein the first external interface unit comprises a peripheral unit in a user-interface and the second external interface unit comprises a communication link in a communication interface.

11. The method of claim 9, further comprising a second interface unit checking step prior to servicing the second external interface unit, said second interface unit checking step comprising checking to determine whether said second external interface unit needs servicing, said second external interface unit servicing step services said second external interface unit only when service is needed based on said second interface checking step, otherwise said servicing of said first external interface unit is resumed.

12. A processor for performing multiple tasks in a pseudo-parallel manner to simulate multi-tasking comprising:

a first external unit servicing means for servicing a first external interface unit to perform a first task;

a second external unit servicing means for servicing a second external interface unit to perform a second task; and a simulated multi-task controller for transparently switching processor control between said first and second external unit servicing means;

wherein said simulated multi-tasking controller switches control from said first external interface unit servicing means to said second interface unit servicing means when a first partial logic unit of work in said first task has been performed and said second external interface unit needs servicing, and wherein said simulated multi-tasking controller switches control from said second external interface unit servicing means to said first interface unit servicing means to resume servicing a second partial logic unit of work in said first task.

13. The processor of claim 12, wherein said simulated multi-tasking controller switches control between said first and second external interface unit servicing means to provide sub-second responses to said first and second external interface units.

14. A simulated multi-tasking apparatus for servicing communication between a processor and multiple external interfaces during continuous operation of an application program, the apparatus comprising:

a user-interface comprising a plurality of peripheral units;

a communication interface comprising at least one communication link;

a user-link servicer comprising a plurality of first program modules for servicing respective peripheral units, at least one of said first program modules having a control switch call inserted after each partial logic unit of work;

a communication link-servicer comprising second program modules for servicing at least one of in-bound and out-bound communication over said communication link between the processor and said communication interface;

a simulated multi-task controller for transparently switching processor control between said user-link servicer and said communication link servicer, wherein said simulated multi-tasking controller switches control from said user-linker servicer to said communication link servicer when said user-interface servicer reads a control switch call after a first partial logic unit of work in a first task of a corresponding first program module being executed and switches control from said communication link-servicer back to said user-interface servicer to resume said first task after at least one partial logical unit of work in a second task of a corresponding second program module has been executed by said communication link servicer.

15. A computer-implemented method for switching control of a processor between multiple computer tasks to simulate multi-tasking, the method comprising the steps of:

switching control of a processor to execute a first module for performing a first task;

executing said first module in said processor;

suspending said executing of said first computer module after a first partial logic unit of work in said first task has been performed;

switching control of the processor from executing said first module to execute a second for performing a second task;

executing said second module in said processor; and switching control of the processor from executing said second module to resume executing said first module when at least one partial logic unit of work has been performed toward said second task, whereby the first and second tasks are performed in a pseudo-parallel sequence to simulate multi-tasking.

16. The method of claim 15, wherein the first task is more time-consuming than the second task as said processor requires more time to execute said first module than said second module.

17. A simulated multi-tasking processor comprising:

a processor for executing first and second computer program modules implementing respective first and second tasks; and a simulated multi-tasking controller for switching control of said processor between executing said first and second computer program modules, wherein said simulated multi-task controller suspends execution of said first computer program module after a first partial logic unit of work in said first task has been performed, switches control of said processor from executing said first computer program module to execute said second computer program module, switches control of said the processor from executing said second computer program module to resume executing said first computer program module when at least one partial logic unit of work has been performed toward said second task, whereby the first and second tasks are performed in a pseudo-parallel sequence to simulate multi-tasking.

18. The apparatus of claim 17, wherein the first task is more time-consuming than the second task as said processor requires more time to execute said first computer program module than said second computer program module.

* * * * *